United States Patent Office 3,836,477
Patented Sept. 17, 1974

3,836,477
STRONTIUM ALUMINATE PHOSPHOR ACTIVATED BY CERIUM AND MANGANESE
Costas C. Lagos, Danvers, Mass., assignor to GTE Sylvania Incorporated
No Drawing. Filed Nov. 15, 1972, Ser. No. 306,931
Int. Cl. C09k 1/68
U.S. Cl. 252—301.4 F        1 Claim

ABSTRACT OF THE DISCLOSURE

A phosphor having the formula $SrAl_{12}O_{19}$:Ce,Mn has intense green emission with narrow band width under ultraviolet radiation. Substitution of 0.3 to about 0.75 moles of $Si^{+++}$ for $Al^{+3}$ results in an increase in emission intensity.

SUMMARY OF THE INVENTION

This invention relates to the discovery and preparation of a cerium and manganese activated strontium aluminate phosphor, $SrAl_{12}O_{19}$:Ce,Mn, for use in fluorescent lamps. The emission peak of this phosphor is at 515 nanometers and it has an extremely narrow emission band width of 22 nanometers at half peak height. This narrow emission band makes the phosphor quite useful in applications where a pure green light source is needed, such as in photocopying.

The narrow emission bandwidth of 22 nanometers is more narrow and thus more pure than that of manganese doped magnesium gallate phosphor, which is currently being used in photocopy applications. Also, the phosphor of this invention is thus far the only known sensitized manganese doped phosphor in which the transfer of energy from the primary activator, in this particular case, cerium, to the secondary activator, manganese (sensitization of manganese), results in a narrow band green emission. All other previously reported manganese sensitizations resulted in emission bands in the red, orange, or yellow regions of the spectrum with extremely wide half height emission bandwidths of 70 nanometers or more.

The basic formula of the instant phosphor is $SrAl_{12}O_{19}$ doped with Ce and Mn. Under 2537A excitation the phosphor emission peak is 515 nanometers with a width at half height of 22 nanometers. Its peak intensity is about 120% of the well known $Zn_2SiO_4$:Mn phosphor and about 80% of the $MgGa_2O_4$:Mn phosphor. The $$SrAl_{12}O_{19}:Ce,Mn$$

phosphor is also excited by 3650A radiation, but to a much lesser degree than by 2537A radiation. Cathode rays also excite the phosphor, but the intensity of luminescence is only fair and the decay time is extremely long.

The temperature dependence of the $SrAl_{12}O_{19}$:Ce,Mn phosphor is also quite good. When the phosphor is excited by 2537A radiation and heated to 300° C., the following peak intensities are obtained at the denoted temperatures:

| Temperature: | Emission Peak Intensity, Percent |
|---|---|
| Room Temperature | 100 |
| 100° C. | 98.1 |
| 200° C. | 90.1 |
| 300° C. | 80.6 |

As a comparison $MgGa_2O_4$:Mn phosphor is completely dead and $Zn_2SiO_4$:Mn phosphor yields only a slightly discernible light green when both of these phosphors are excited by 2537A at 300° C.

The main advantages of this phosphor are its narrow emission band, its excellent stability, and its low cost. Raw material costs are about $1.50/lb. compared to about $200/lb. for $MgGa_2O_4$:Mn and $3.75/lb. for $Zn_2SiO_4$:Mn.

The following lifetest data show the performance of a modified version of the $SrAl_{12}O_{19}$:Ce,Mn phosphor in 40 W. fluorescent lamps as compared to typical samples of $Zn_2SiO_4$:Mn and $MgGa_2O_4$:Mn.

| Phosphor | Emission peak, nanometers | Width at half height | Lumens 0 hrs. | Lumens 100 hrs. | Percent maintenance |
|---|---|---|---|---|---|
| $SrAl_{11}Si_{.75}O_{19}$:Ce$_{.15}$Mn$_{.15}$ | 515 | 22 | 2,193 | 2,147 | 97.7 |
| $MgGa_2O_4$:Mn | 505 | 30 | 2,217 | 2,119 | 95.5 |
| $Zn_2SiO_4$:Mn | 528 | 42 | 4,814 | 4,502 | 93.5 |

The total lumens of the instant phosphor are less than that of the other two phosphors, but this is due to the extreme narrowness of its emission band compared to the broader bands of the other two phosphors. The stability of the instant phosphor in fluorescent lamps is also significantly better than that of the other two standard phosphors, as can be seen from the above maintenance values. This good stability in lamps is also quite unusual for a cerium doped phosphor, because it has been historically known in the art that cerium doped phosphors have very poor brightness stability in fluorescent lamps. For example, the percent maintenance of other calcium doped phosphors, such as $LaPO_4$:Ce or $YPO_4$:Ce, or $LaPO_4$:Ce,Tb is about 80% at 100 hours.

The preferred formulation for the preparation of the instant phosphor is $SrAl_{11}Si_{.75}O_{19}$:Ce$_{.15}$ plus 1.05 moles of fluoride/mole (added to the blend mix before firing) of $SrAl_{11}Si_{.75}O_{19}$ to serve as a flux. The addition of the fluoride flux speeds up the reaction and the formation of the $SrAl_{12}O_{19}$ structure and also promotes better crystallinity. X-ray diffraction data obtained from the fluxed material give the same X-ray results as that obtained from the nonfluxed material indicating that the fluoride serves only as a catalyst and that it does not enter the $SrAl_{12}O_{19}$ matrix. The fluoride may be added as either $SrF_2$ or $AlF_3$, but $AlF_3$ is preferred.

The substitution of a small amount of $Si^{+4}$ for $Al^{+3}$ (.75$Si^{+4}$ for 1.0$Al^{+3}$) in $SrAl_{12}O_{19}$:Ce,Mn has been found to give about a 5% increase in emission intensity. Other ions such as $P^{+5}$, $Ti^{+4}$, $Zr^{+4}$, $Y^{+3}$, $Gd^{+3}$, and $La^{+3}$ have also been substituted for Al in various concentrations, but a substantial decrease, and in the cases of $P^{+5}$ and $Ti^{+4}$, a drastic decrease, in emission intensity is observed when these ions are used. Substitutions of various ions such as $Ba^{+2}$, $Zn^{+2}$, $Ca^{+2}$, $Mg^{+2}$, and $Cd^{+2}$ for $Sr^{+2}$ have also been tried. Small amounts of $Ca^{+2}$, $Ba^{+2}$, and $Zn^{+2}$ (about .15 moles of each), substituted for $Sr^{+2}$, decrease emission intensity only slightly (5% or less) or not at all, while comparable amounts of $Mg^{+2}$ and $Cd^{+2}$ reduce the intensity considerably (30 to 50%). As the concentrations of the substituted $Ca^{+2}$, $Ba^{+2}$, and $Zn^{+2}$ ions are increased above 0.15 moles, the rate of decrease of emission intensity is greatly increased.

SPECIFIC EXAMPLES

1. $SrAl_{12}O_{19}$:Ce$_{.15}$Mn$_{.15}$ phosphor is prepared by using the following luminescent-grade materials with the indicated mole ratios and/or weights:

| Material | Moles | Grams |
|---|---|---|
| $SrCO_3$ | 1.0 | 147.6 |
| $AlF_3$ | .35 | 25.7 |
| $Al_2O_3$ | 5.825 | 593.9 |
| $CeO_2$ | .15 | 25.8 |
| $MnCO_3$ | .15 | 17.2 |

The weighed out materials are placed in a covered polypropylene container with glass beads and mixed by agitation in a Spex Model 8000–II mixer-mill for 20 minutes. The mixture is then placed in a Shenango Refractories crucible (6" O.D. x 6.5" high), mix 64–99 and fired uncovered for 3 hours at 1400° C. in ambient air. Next, the cooled material is broken up and put into 6" x 1½" x 2" silica boats. These boats are then placed at the closed end of a closed-at-one-end silica tube which is stoppered at the other end containing small inlet and outlet tubes. Nitrogen is then flowed through the inlet tube until the residual air in the silica tube has been expelled and replaced with nitrogen. The closed end of the silica tube, containing the silica boat plus the powder, is then placed in a furnace, with the nitrogen still flowing at a rate of 5 c.f.h., and fired for one hour at 1300° C.

The silica tube is removed from the furnace and the phosphor is allowed to cool in the flowing nitrogen atmosphere. The phosphor is then broken up, sieved through a 200-mesh screen, and then washed with a dilute acid solution (5 ml. of HCl per 1000 ml. of deionized water) for about 10 minutes. This is followed by washing with water until all traces of acid are removed, and then by a basic solution wash (5 ml. NH$_4$OH per 1000 ml. of water) for 10 minutes. The phosphor is then dried in an oven and is ready for use in fluorescent lamps.

2. $SrAl_{11.0}Si_{.75}O_{19}:Ce_{.15}Mn_{.15}$ phosphor is prepared by using the following luminescent materials with the indicated mole ratios and/or weights:

| Material | Moles | Grams |
|---|---|---|
| SrCO$_3$ | 1.0 | 147.6 |
| AlF$_3$ | .35 | 25.7 |
| Al$_2$O$_3$ | 5.325 | 542.9 |
| SiO$_2$ | .75 | 45.1 |
| CeO$_2$ | .15 | 25.8 |
| MnCO$_3$ | .15 | 17.2 |

The same procedure is then used as in Example No. 1 to complete the preparation of this phosphor.

The composition and preparation parameters which may be varied from the preferred composition of

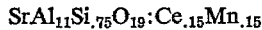

$SrAl_{11}Si_{.75}O_{19}:Ce_{.15}Mn_{.15}$ and the above preparation procedure and which still give a suitably bright phosphor are as follows:

(1) Small amounts of Ca$^{+2}$, Ba$^{+2}$, and Zn$^{+2}$ (about .15 moles of each) can be substituted for Sr$^{+2}$ without any appreciable decrease in brightness. The concentration of the total unsubstituted (Sr$^{+2}$ only) or substituted (Sr$^{+2}$ plus Ca$^{+2}$, or Ba$^{+2}$, or Zn$^{+2}$) cation, may be varied from 0.9 to 1.1 (with all other constituents unchanged) without a substantial decrease in emission intensity. Concentrations of Sr$^{+2}$, or total divalent cation greater than 1.1 or less than 0.9, cause substantial decrease in brightness.

(2) An increase in the substituted Si concentration much above about 0.75 moles causes substantial decrease in emission intensity, while concentrations of substituted Si less than about 0.3 moles show no significant increase in intensity above that obtained from a composition containing no Si at all. Also, as mentioned previously, the substitution of other ions (P$^{+5}$, Ti$^{+4}$, Zr$^{+4}$, Y$^{+3}$, Gd$^{+3}$, and La$^{+3}$) for Al, in concentrations large enough to cause an effect, result in decreases in brightness.

(3) 1.05 moles of fluoride per mole of SrAl$_{12}$O$_{19}$ is the preferred concentration of flux. Concentrations of fluoride between about 0.7 to 1.05 moles give slightly reduced emission intensities, while concentrations of fluoride less than about 0.7 moles lead to larger intensity decreases. Concentrations of fluoride from 1.05 to about 2.0 moles also give good phosphors with slightly decreasing intensities as the 2.0 fluoride concentration is approached. Concentrations of fluoride greater than 2.0 moles begin to give large brightness losses and phosphors which are physically harder and somewhat sintered. SrF$_2$ may be used instead of AlF$_3$ as a source of fluoride.

(4) The cerium concentration may be varied from .07 to .4 moles and the manganese concentration from 0.1 to 0.4 moles, both per mole of SrAl$_{12}$O$_{19}$, so long as the sum total of the two activators is about 0.3 moles or less. The preferred sum total of the two activators is about 0.3 moles. Sum totals from 0.3 to 0.8 moles result in slightly reduced emission intensities, while values less than about .15 moles give rise to much greater losses.

(5) Firing times for the first firing at 1400° C. may be varied from 3 to 7 hours with a minimum of 3 hours being necessary in order to assure good crystallinity, completeness of reaction, and good brightness. Firing times longer than 7 hours give rise to gradual decreasing brightnesses. Lower temperatures down to about 1200° C. may be used but these would require even longer firing times. Firing temperatures below 1200° C. are not feasible.

Firing times and temperatures for the second firing in N$_2$ may vary between one to three hours at 1200° C. or 1 to 2 hours at 1300° C. or 1350° C. Longer firing times or lower than 1200° C. firing temperatures result in greatly decreased emission intensities.

(6) N$_2$ flow rates may be varied from 4 to 12 c.f.h. without any change in emission intensity. Flow rates lower than 4 c.f.h. result in lower emission intensities. Instead of N$_2$, a slightly reducing atmosphere of 1% H$_2$ 99% N$_2$ (by volume) may be used. This method gives about the same emission intensity, but it also imparts a slight gray body color to the phosphor which is not desirable for fluorescent lamp use.

I claim:

1. A cerium and manganese activated strontium aluminate phosphor having the basic formula SrAl$_{12}$O$_{19}$ wherein about 0.3 to about 0.75 moles of Si$^{+4}$ is substituted for Al$^{+3}$ in a substitution ratio of 3Si to 4Al and wherein cerium is present in an amount of .07 to .4 moles per mole of SrAl$_{12}$O$_{19}$ and manganese is present in an amount of .1 to .4 moles per mole of SrAl$_{12}$O$_{19}$ and the sum of cerium and manganese is less than about .8 moles per mole of SrAl$_{12}$O$_{19}$.

References Cited
UNITED STATES PATENTS

| | | | |
|---|---|---|---|
| 3,649,550 | 3/1972 | Chenot | 252—301.4 R |
| 2,754,444 | 7/1956 | Zalm et al. | 252—301.4 F X |
| 2,308,736 | 1/1943 | Aschermann et al. | 252—301.4 F |
| 3,502,592 | 3/1970 | Armster | 252—301.4 F |

OTHER REFERENCES

Kroger: "Some Aspects of the Luminescence of Solids," Elsevier Pub. Co. (1948), pp. 90 and 97.

JACK COOPER, Primary Examiner

U.S. Cl. X.R.

252—301.4 R